(12) United States Patent
Hattori et al.

(10) Patent No.: US 7,942,583 B2
(45) Date of Patent: May 17, 2011

(54) ROLLING BEARING CAGE, BALL BEARING AND ROLLER BEARING

(75) Inventors: Tomoya Hattori, Kashiba (JP); Hiroshi Ueno, Tondabayashi (JP); Satoshi Hashimoto, Kyoto (JP); Yoshihisa Kaneko, Sakai (JP)

(73) Assignees: JTekt Corporation, Osaka (JP); Satoshi Hashimoto, Kyoto (JP); Yoshihisa Kaneko, Osaka (JP)

( * ) Notice: Subject to any disclaimer, the term of this patent is extended or adjusted under 35 U.S.C. 154(b) by 560 days.

(21) Appl. No.: 11/992,475

(22) PCT Filed: Sep. 27, 2006

(86) PCT No.: PCT/JP2006/319168
§ 371 (c)(1),
(2), (4) Date: Mar. 24, 2008

(87) PCT Pub. No.: WO2007/037267
PCT Pub. Date: Apr. 5, 2007

(65) Prior Publication Data
US 2009/0245711 A1     Oct. 1, 2009

(30) Foreign Application Priority Data

Sep. 27, 2005 (JP) .................................. 2005-279894
Sep. 27, 2005 (JP) .................................. 2005-279902

(51) Int. Cl.
*F16C 33/44* (2006.01)
(52) U.S. Cl. ....................................... 384/527; 384/573
(58) Field of Classification Search .................. 384/492, 384/523–534, 572–580
See application file for complete search history.

(56) References Cited

U.S. PATENT DOCUMENTS

| 1,928,352 | A | * | 9/1933 | Goodell | 384/527 |
|---|---|---|---|---|---|
| 5,234,274 | A | | 8/1993 | Honda et al. | |
| 5,593,234 | A | * | 1/1997 | Liston | 384/492 |
| 6,981,801 | B2 | | 1/2006 | Yokota | |
| 6,994,475 | B2 | * | 2/2006 | Doll et al. | 384/492 |
| 7,172,343 | B2 | * | 2/2007 | Kinno et al. | 384/492 |
| 7,393,594 | B2 | | 7/2008 | Yamasaki et al. | |
| 2004/0264820 | A1 | | 12/2004 | Tsuji et al. | |

FOREIGN PATENT DOCUMENTS

| JP | 5-187445 | 7/1933 |
|---|---|---|
| JP | 52-18341 | 2/1977 |
| JP | 5-157116 A | 6/1993 |
| JP | 7-301241 | 11/1995 |
| JP | 2001-304268 | 10/2001 |
| JP | 2002-195270 | 7/2002 |
| JP | 2005-23345 | 1/2005 |
| JP | 2005-48834 | 2/2005 |
| JP | 2005-146405 A | 6/2005 |

OTHER PUBLICATIONS

International Search Report for PCT/JP2006/319168 mailed Jan. 9, 2007.
English translation of the International Preliminary Report on Patentability mailed Apr. 10, 2008 in corresponding PCT Application No. PCT/JP2006/319168.

* cited by examiner

*Primary Examiner* — Thomas R Hannon
(74) *Attorney, Agent, or Firm* — Nixon & Vanderhye, P.C.

(57) ABSTRACT

A multilayer film 21 is formed by layering layers whose adjoining layers are made of mutually different metals or alloys by an electroplating process on a surface of a metallic annular main body part 20 that has a pocket to accommodate a ball by holding the ball from both sides in the axial direction.

17 Claims, 13 Drawing Sheets

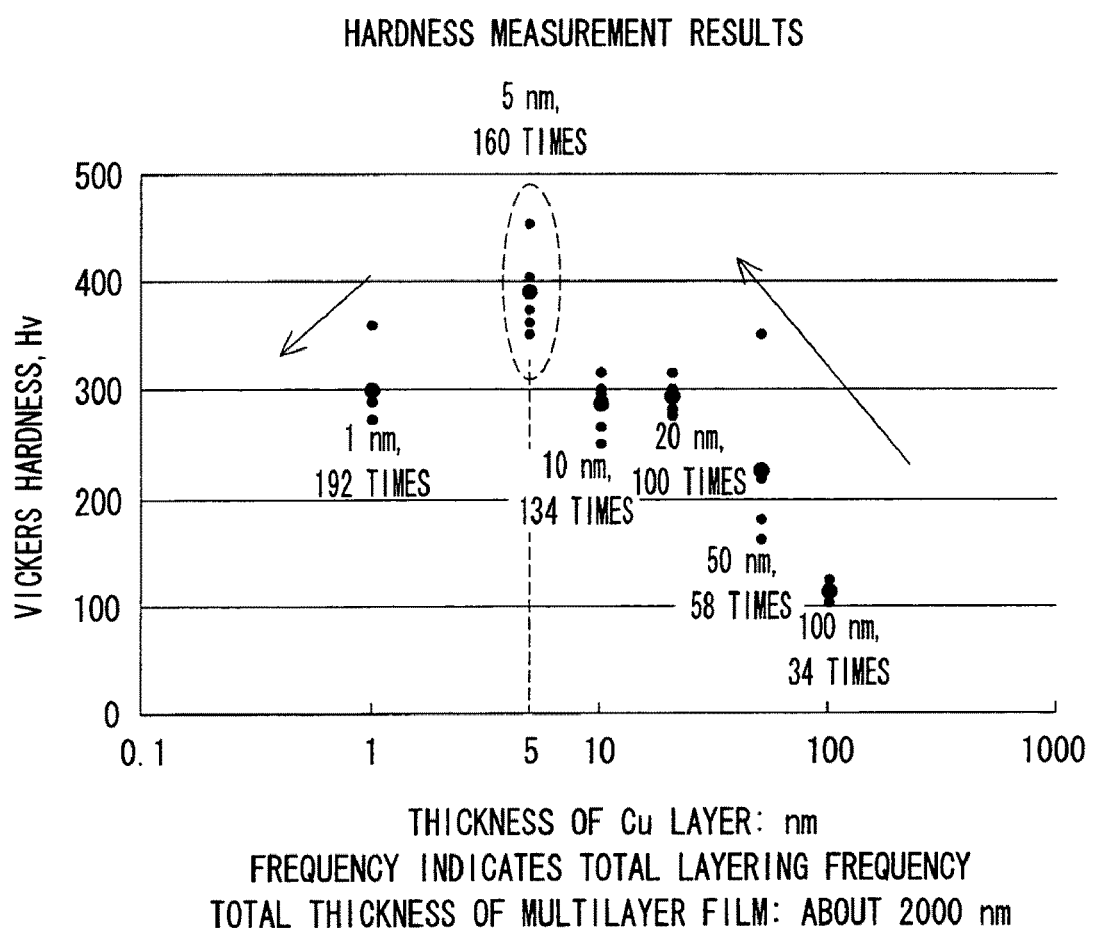

X-RAY DIFFRACTION OF NANO-MULTILAYER FILM WHEN
Ni AND Cu BOTH HAVE THICKNESS OF 100 nm

X-RAY DIFFRACTION OF NANO-MULTILAYER FILM
WHEN Ni AND Cu BOTH HAVE THICKNESS OF 5 nm

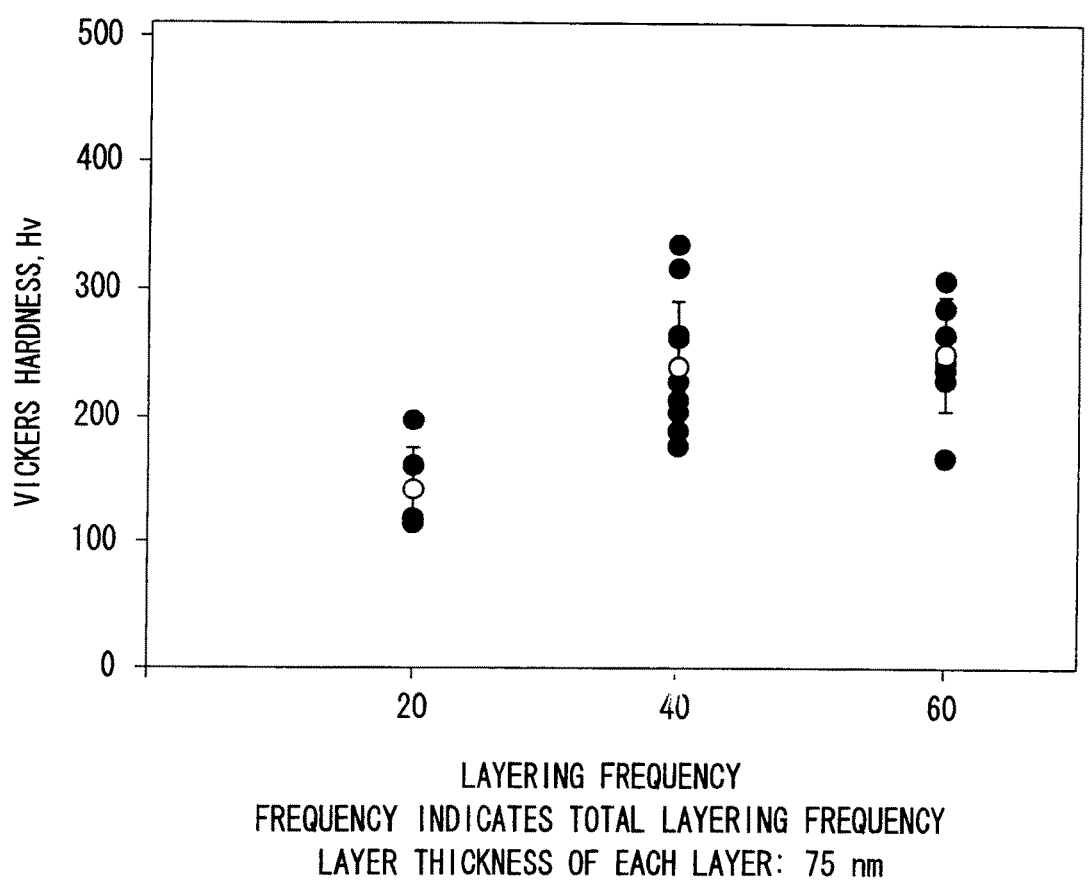

ROLLING BEARING CAGE, BALL BEARING AND ROLLER BEARING

This application is the U.S. national phase of International Application No. PCT/JP2006/319168, filed 27 Sep. 2006, which designated the U.S. and claims priority to Japanese Patent Application Nos. 2005-279894, filed 27 Sep. 2005, and 2005-279902, filed 27 Sep. 2005, the entire contents of each of which are hereby incorporated by reference.

TECHNICAL FIELD

The present invention relates to rolling bearing cages and relates, in particular, to a ball bearing cage and a roller bearing cage. The present invention relates also to a ball bearing and a roller bearing.

BACKGROUND ART

Conventionally, there has been a ball bearing cage described in JP 2001-304268 A. The ball bearing cage is formed by rivet connecting same two wave-shaped annular plate members of an alternate succession of semicircular portions and flat portions. The wave-shaped annular plate members are formed by press forming annular metal plate members, and one through hole is formed generally at the center of each flat portion of the annular plate members. After the two wave-shaped annular plate members are placed facing each other so that the through holes of the two wave-shaped annular plate members face each other, a rivet is inserted penetrating the two through holes whose openings are brought in contact with each other, and end face of the rivet inserted through the through hole and located on the opposite side of the head portion are beaten by a hammer or a rivet gun, connecting the two wave-shaped annular plate members together. When the two wave-shaped annular plate members are connected together, the semicircular portion of one wave-shaped annular plate member and the semicircular portion of the other wave-shaped annular plate member conjointly form a generally cylindrical circumferentially inner surface. The generally cylindrical inner surface constitutes a pocket to accommodate a ball. The ball bearing cage has the advantages that it can be manufactured simply at low cost and has excellent heat resistance since it is made of metal.

However, the conventional ball bearing cage is rigid with poor flexibility although it has excellent heat resistance. When the ball bearing is used under momental load conditions and hard acceleration and deceleration conditions, moving differences, i.e., lead and lag occur among individual balls. When the ball bearing including the conventional rigid ball bearing cage is used under the momental load conditions and the hard acceleration and deceleration conditions as described above, the cage cannot follow the lead and lag of the balls with its elastic deformation, and the balls and the inner circumferential surfaces of the pockets of the ball bearing cage are brought in intense contact with each other. There is a problem that a tensile force and a compressive force are generated between adjoining pockets due to the intense contact, causing the occurrence of tear of break or the like particularly in proximate portions including boundaries between the semicircular portions and the flat portions located between adjoining pockets of the ball bearing cage and in neighborhood portions including the through holes through which the rivets penetrate and seizure between the balls and the inner circumferential surfaces of the pockets. Moreover, the inertial force of the cage is great due to its mass, and this also influences the torque of the ball bearing.

If the thickness of the plate member is increased to prevent the tear of break or the like, the strength of the cage can be increased, while there is a problem that the form accuracy of the surfaces that hold the balls is degraded and the contact between the cage and the balls becomes nonuniform. Moreover, there is a problem that the manufacturing cost of the cage is increased and the weight and the axial dimension of the cage are increased. On the other hand, the conventional ball bearing cage has a problem that the tear of break or the like occurs in the cage since mechanical characteristics of tensile strength, fatigue strength and so on of the cage become insufficient when the thickness of the plate member is reduced although the axial dimension of the cage can be reduced to allow the cage to be reduced in weight, improved in torque characteristics and improved in flexibility.

Further, a resin-made cage formed of polyamide 66 or the like has also conventionally been known. The resin-made cage generally has heat resistance inferior to that of one made of metal (particularly made of steel) although it has excellent flexibility and light weight, and, for example, polyamide 66 practically has a use upper limit temperature of about 120° C. Even a heat-resistant resin has, for example, a use upper limit temperature of about 200° C. and is also very expensive. Moreover, the resin-made cage also has a problem that it is deteriorated by oil components and additives of a lubricant and degraded in strength. Moreover, it is also known that the resin-made cage generates a weld when manufactured by injection molding and easily breaks at the portion. Resin has a coefficient of linear expansion greater than that of metal (particularly steel) and ceramic. When a resin-made cage is incorporated into a ball bearing, the ball bearing causes torque fluctuations, generation of noises and generation of vibrations due to changes in clearance caused by temperature changes.

Moreover, there has conventionally been a roller bearing cage described in JP 2005-048834 A. The cage is made of a metal plate member and forms pockets that accommodate tapered rollers by connecting a minor diameter annular portion and a major diameter annular portion with a plurality of bar portions. The cage has excellent heat resistance since it is made of the metal plate member. An outer end portion in the axial direction of the minor diameter annular portion is bent inward in the radial direction. The conventional tapered roller bearing secures the strength in the radial direction of the cage by bending the outer end portion in the axial direction of the minor diameter annular portion inward in the radial direction. However, there is a problem that, when the cage is reduced in thickness for the demand of reducing the weight of the cage, the strength is insufficient only by bending the minor diameter annular portion.

Moreover, the cage becomes rigid when increased in thickness similar to or further than in the conventional case in order to maintain the strength of the cage. When the roller bearing is used under momental load conditions and hard acceleration and deceleration conditions, lead and lag of rollers occur. However, when a roller bearing in which a rigid cage is incorporated is used under momental load conditions and hard acceleration and deceleration conditions, the cage cannot follow the lead and lag of the rollers, and the rollers and the inner circumferential surfaces of the pockets of the cage are brought in intense contact with each other. There is a problem that seizure occurs between the rollers and the pockets of the cage and the cage is broken by a tensile force and a compressive force generated between adjoining pockets due to the intense contact.

Moreover, there is a problem that, when the roller bearing cage is a needle roller bearing cage, the cage has a very weak strength since the axial end portion cannot be bent in the radial direction.

Further, a resin-made cage formed of polyamide 66 or the like has also conventionally been known. The resin-made cage generally has heat resistance inferior to that of one made of metal (particularly made of steel) although it has excellent flexibility and light weight, and, for example, polyamide 66 practically has a use upper limit temperature of about 120° C. Even a heat-resistant resin has, for example, a use upper limit temperature of about 200° C. and is also very expensive. Moreover, the resin-made cage also has a problem that it is deteriorated by oil components and additives of a lubricant and degraded in strength. Moreover, it is also known that the resin-made cage generates a weld when manufactured by injection molding and easily breaks at the portion. Resin has a coefficient of linear expansion greater than that of metal (particularly steel) and ceramic. When a resin-made cage is incorporated into a roller bearing, the roller bearing causes torque fluctuations, generation of noises and generation of vibrations due to changes in clearance caused by temperature changes.

It is an object of the present invention to provide a rolling bearing cage, which is compact and has great strength and excellent flexibility, heat resistance and oil resistance. It is a particular object to provide a ball bearing cage, which has a small axial dimension of the cage, light weight, great strength and hardness, and excellent flexibility, heat resistance, oil resistance and abrasion resistance, and a ball bearing that has the ball bearing cage. Another particular object is to provide a roller bearing cage, which is lightweight and compact and has great strength and excellent flexibility, heat resistance and oil resistance, and a roller bearing that has the roller bearing cage.

DISCLOSURE OF THE INVENTION

In order to achieve the above object, there is provided a rolling bearing cage comprising:
an annular main body part; and
a multilayer film which is formed layered on a surface of the main body part by an electroplating process and in which adjoining layers are comprised of mutually different metals or alloys.

According to the present invention, by forming the interfaces that become obstructions of dislocation motions between adjoining layers in the multilayer film formed on the surface of the cage, the strength and hardness of the cage can be improved.

Moreover, since the mechanical strength is increased by the multilayer film formed on the surface of the main body part, the main body part can be reduced in thickness in the axial direction. Therefore, the cage that has great strength and hardness, flexibility, excellent heat resistance, abrasion resistance and oil resistance, light weight and is hard to damage can be provided. Moreover, since the strength of the cage is increased, the cage can be reduced in thickness. That is, the cage is allowed to have a thickness that can be easily made highly accurate by press forming.

Moreover, since the multilayer film is formed by an electroplating process, the multilayer film can be formed at lower cost than when the multilayer film is formed by a vacuum deposition process. Moreover, the multilayer film where each of the layers has an approximately uniform layer thickness can be formed on the entire surface of the end face.

In one embodiment of the invention, the main body part comprises a pocket which accommodates a ball by holding the ball from both sides in an axial direction of the main body part.

According to the above embodiment, by forming the interfaces that become obstructions of dislocation motions between adjoining layers in the multilayer film formed on the surface of the cage, the strength and hardness of the cage can be improved. Moreover, since the strength of the cage is improved, sufficient strength against the tensile force and the compressive force in the circumferential direction of the cage caused by the lead and lag of the balls is provided, and the damage of the cage can be suppressed. Therefore, the lifetime of the ball bearing having the ball bearing cage can be prolonged.

Moreover, according to the above embodiment, since the mechanical strength is increased by the multilayer film formed on the surface of the main body part, the main body part can be reduced in thickness in the axial direction. Therefore, the cage that has great strength and hardness, flexibility, excellent heat resistance, abrasion resistance and oil resistance, light weight and is hard to damage can be provided. Moreover, since the strength of the cage is increased, the cage can be reduced in thickness. That is, since the cage is allowed to have a thickness that can be easily made highly accurate by press forming, the accuracy of the ball guiding surface of the cage, which has been heavily inferior to the sphericity of the ball, can be remarkably improved, and the rotary torque and vibrations can be remarkably reduced.

In one embodiment of the invention, the multilayer film is formed on an outer surface in the axial direction of the main body part.

According to the above embodiment, since the multilayer film formed on the outer surface in the axial direction is not brought in sliding contact with the balls, the multilayer film can be maintained over a long period of time.

In one embodiment of the invention, the rolling bearing cage is formed by connecting two wave-shaped annular plate members of an alternate succession of semicircular portions and flat portions, and
the multilayer film is formed so as to include boundaries between the semicircular portions and the flat portions.

According to the above embodiment, the strength of the portion where particularly the tear of break or the like easily occurs can be improved, and the tear can be suppressed. Moreover, since the main body part can be reduced in thickness in the axial direction by virtue of the improvement in strength, the flexibility of the portion can be improved, and the tear can be further suppressed in this case.

In one embodiment of the invention, the rolling bearing cage is formed by connecting a plurality of members, and
the multilayer film is formed so as to include the connecting portions.

According to the above embodiment, the strength of the portion where particularly the tear of break or the like easily occurs can be improved, and the tear can be suppressed.

In one embodiment of the invention, the multilayer film is a multilayer film in which nickel layers and copper layers are alternately layered.

According to the above embodiment, the multilayer film can be satisfactorily formed by the electroplating process.

In one embodiment of the invention, each of the nickel layers in the multilayer film has a layer thickness of not smaller than 15 nm and not greater than 100 nm, each of the copper layers in the multilayer film has a layer thickness of not smaller than 3 nm and not greater than 100 nm, and the multilayer film has a film thickness of exceeding 200 nm and not greater than 8000 nm.

It is noted that the present invention also includes the case where only one nickel layer exists in the multilayer film. In this case, the layer thickness of the sole nickel layer in the multilayer film is assumed to be not smaller than 15 nm and not greater than 100 nm. Moreover, the present invention also includes the case where only one copper layer exists in the multilayer film. In this case, the layer thickness of the sole copper layer in the multilayer film is assumed to be not smaller than 3 nm and not greater than 100 nm.

According to the above embodiment, the layer thickness of the nickel layer is not smaller than 15 nm and not greater than 100 nm, the layer thickness of the copper layer is not smaller than 3 nm and not greater than 100 nm, and the total film thickness of the multilayer film is greater than 200 nm. Therefore, the interfaces that become the obstructions of dislocation motions are allowed to be sufficient in number to improve the strength of the cage. Moreover, since the strength of the cage is improved, the axial dimension of the cage can be reduced. With this arrangement, the mass of the cage is reduced, and the cage is allowed to have a thickness that can be easily made highly accurate by press forming. Therefore, the rotary torque and vibrations of the bearing can be remarkably reduced. Moreover, since the total thickness of the multilayer film is not greater than 8000 nm, the material cost and the manufacturing cost of the multilayer film can be reduced. Moreover, since the strength of the cage is improved, sufficient strength against the tensile force and the compressive force in the circumferential direction of the cage caused by the lead and lag of the balls is provided, and the damage of the cage can be suppressed. Therefore, the lifetime of the ball bearing having the ball bearing cage can be prolonged. Moreover, since the strength of the cage is increased, the cage can be reduced in thickness. That is, since the cage is allowed to have a thickness that can be easily made highly accurate by press forming, the accuracy of the ball guiding surface of the cage, which has been heavily inferior to the sphericity of the ball, can be improved, and the rotary torque and vibrations can be remarkably reduced.

In one embodiment of the invention, the multilayer film is formed by layering the nickel layers and the copper layers in excess of 20 times.

According to the above embodiment, the hardness of the surface of the cage can be made remarkably greater than when the number of interfaces between the nickel layers and the copper layers is not greater than 20.

In one embodiment of the invention, a ball bearing is provided with the above rolling bearing cage.

According to the present invention, since the ball bearing is provided with the above rolling bearing cage, the strength of the cage can be increased, and the reliability of the ball bearing can be improved. Moreover, the axial dimension of the cage can be reduced, and the cage can be reduced in weight. Moreover, the main body part of the cage, which can be reduced in the axial thickness, therefore has great strength and hardness and flexibility. Therefore, the reliability of the ball bearing can be improved. Moreover, the bearing is excellent in heat resistance and oil resistance, lightweight and hard to damage and has a small torque.

In one embodiment of the invention, the main body part is formed by connecting between two annular portions with a plurality of bar portions and has a pocket to accommodate a roller.

According to the above embodiment, by forming the interfaces that become obstructions of dislocation motions between adjoining layers in the multilayer film formed on the surface of the cage, the strength and hardness of the cage can be improved. Moreover, since the strength of the cage is improved, sufficient strength against the tensile force and the compressive force in the circumferential direction of the cage caused by the roller behaviors of the lead, lag, skew and so on is provided, and the damage of the cage can be suppressed. Therefore, the lifetime of the roller bearing having the roller bearing cage can be prolonged.

Moreover, according to the above embodiment, since the mechanical strength is increased by the multilayer film formed on the surface of the main body part, the thickness in the direction perpendicular to the circumferential direction of the main body part can be reduced. Therefore, the cage is allowed to have great strength and hardness, flexibility, excellent heat resistance, abrasion resistance and oil resistance and is light weight and hard to damage. Moreover, since the strength of the cage is increased, the cage can be reduced in thickness. When the cage is manufactured by press forming, the cage is allowed to have a thickness that can be easily made highly accurate by press forming, and therefore, the accuracy of the inner circumferential surfaces of the pockets of the cage can be remarkably improved. This allows the roller behaviors to be stabilized by reducing skew of the rollers, allows the rotary torque and vibrations of the bearing to be remarkably reduced and allows the lifetime of the roller bearing to be prolonged.

In one embodiment of the invention, the multilayer film is formed on an outer surface in a radial direction of the main body part.

According to the above embodiment, since the multilayer film formed on the outer surface in the radial direction is not brought in sliding contact with the rollers, the multilayer film can be maintained over a long period of time.

In one embodiment of the invention, the multilayer film is formed on an inner surface in a radial direction of the main body part.

According to the above embodiment, since the multilayer film formed on the inner surface in the radial direction is not brought in sliding contact with the rollers, the multilayer film can be maintained over a long period of time.

In one embodiment of the invention, the multilayer film is a multilayer film in which nickel layers and copper layers are alternately layered.

According to the above embodiment, the multilayer film can be satisfactorily formed by the electroplating process.

In one embodiment of the invention, each of the nickel layers in the multilayer film has a layer thickness of not smaller than 15 nm and not greater than 100 nm, each of the copper layers in the multilayer film has a layer thickness of not smaller than 3 nm and not greater than 100 nm, and the multilayer film has a film thickness of exceeding 200 nm and not greater than 8000 nm.

It is noted that the present invention also includes the case where only one nickel layer exists in the multilayer film. In this case, the layer thickness of the sole nickel layer in the multilayer film is assumed to be not smaller than 15 nm and not greater than 100 nm. Moreover, the present invention also includes the case where only one copper layer exists in the multilayer film. In this case, the layer thickness of the sole copper layer in the multilayer film is assumed to be not smaller than 3 nm and not greater than 100 nm.

According to the above embodiment, the layer thickness of the nickel layer is not smaller than 15 nm and not greater than 100 nm, the layer thickness of the copper layer is not smaller than 3 nm and not greater than 100 nm, and the total film thickness of the multilayer film is greater than 200 nm. Therefore, the interfaces that become the obstructions of dislocation motions are allowed to be sufficient in number to improve the strength of the cage. Moreover, since the strength of the cage is improved, the axial dimension of the cage can be reduced. Moreover, since the thickness of the multilayer film is not greater than 8000 nm, the material cost and the manufacturing cost of the multilayer film can be reduced. Moreover, since the strength of the cage is improved, sufficient strength against the tensile force and the compressive force in the circumferential direction of the cage caused by the roller behaviors of the lead, lag, skew and so on is provided, and the damage of the cage can be suppressed. Therefore, the lifetime of the roller bearing having the roller bearing cage can be prolonged. Moreover, since the strength of the cage is increased, the cage can be reduced in thickness. When the cage is manufactured by press forming, the cage is allowed to have a thickness that can be easily made highly accurate by press forming, and therefore, the accuracy of the inner circumferential surfaces of the pockets of the cage can be remarkably improved. This allows the roller behaviors to be stabilized by reducing skew of the rollers, allows the rotary torque and vibrations of the bearing to be remarkably reduced and allows the lifetime of the roller bearing to be prolonged.

In one embodiment of the invention, the multilayer film is formed by layering the nickel layers and the copper layers in excess of 20 times.

According to the above embodiment, the hardness of the surface of the cage can be made remarkably greater than when the number of interfaces between the nickel layers and the copper layers is not greater than 20.

In one embodiment of the invention, a roller bearing is provided with the above rolling bearing cage.

According to the present invention, since the roller bearing is provided with the above rolling bearing cage, the strength of the cage can be increased, and the strength of the roller bearing can be increased. Moreover, since the thickness of the cage is thin and the weight of the cage is light, the roller bearing can be reduced in weight. Moreover, the cage, which has a thin thickness, has great strength and hardness and flexibility. Therefore, the reliability of the roller bearing can be improved. Moreover, the bearing is excellent in heat resistance and oil resistance, lightweight and hard to damage and has a small torque.

BRIEF DESCRIPTION OF THE DRAWINGS

FIG. 6 is a graph showing a relation between the layer thickness of one copper layer and the Vickers hardness of a multilayer film when the multilayer film formed by alternately layering nickel layers of a consistently identical layer thickness of 20 nm and copper layers of which the layer thickness is consistently identical and the layer thickness is varied;

FIG. 9 is a graph showing the results of measuring the Vickers hardness of specimens obtained by alternately layering nickel layers of a consistently identical layer thickness of 75 nm and copper layers of a layer thickness equal to that of the nickel layers 20 times, 40 times and 60 times;

DETAILED DESCRIPTION OF THE INVENTION

Figure 1A:
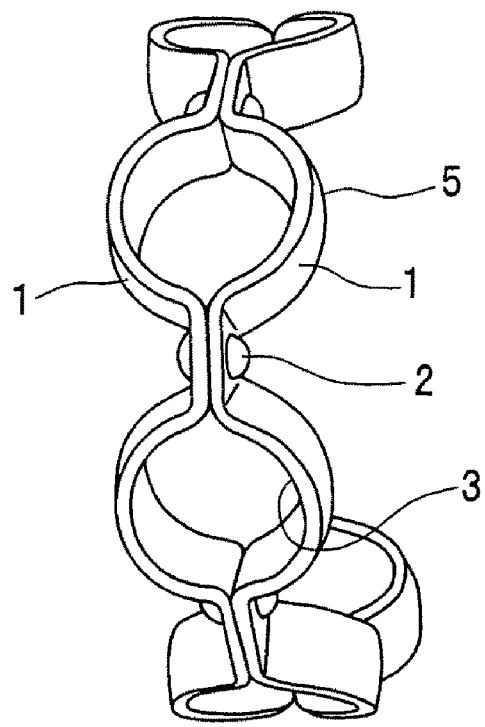
FIG. 1A is a perspective view of part of a ball bearing cage of a first embodiment of the present invention.

The present invention will now be described below by the embodiments shown in the drawings.

FIG. 1A is a perspective view of part of a ball bearing cage of a first embodiment of the present invention.

The ball bearing cage has an annular shape. The ball bearing cage is formed by arranging two identical wave-shaped annular plate members 1, 1 of an alternate succession of semicircular portions and flat portions having through holes so that the through holes face each other and connecting the two wave-shaped annular plate members 1, 1 by rivet connection of a rivet 2 inserted so that it penetrate the openings of the two through holes in mutual contact. The semicircular portion of the annular plate member 1 of one wave-shaped annular plate member 1 and the semicircular portion of the annular plate member 1 of the other wave-shaped annular plate member 1 conjointly form a generally cylindrical inner surface. The generally cylindrical surface constitutes a pocket 3 that accommodates a ball (not shown). The cage is formed as follows. First of all, an annular steel plate member made of SPCC (JIS G 3141: cold-rolled steel) is press-formed to form annular members which are made of SPCC of an alternate succession of semicircular portions and flat portions and in which one through hole is formed generally at the center of each of the flat portions. Next, a multilayer film constructed of nickel layers and copper layers is formed on the entire surface of the two annular plate members by an electroplating process described in detail below. Subsequently, the two wave-shaped annular plate members are arranged so that the through holes of the two wave-shaped annular plate members on which the multilayer film is formed face each other when a ball bearing is assembled, and thereafter, the rivet 2 is inserted to penetrate the two through holes of which the openings are in mutual contact. Further, end face of the rivet 2 inserted through the through holes located on the opposite side of the head portion are beaten by a hammer or a rivet gun, connecting the two wave-shaped annular plate members together. The ball bearing cage is formed as described above. That is, with the ball bearing cage, the ball bearing is formed by the connection described above after making the balls correspond to the pockets of the cage in a state in which a prescribed number of balls are assembled in between the inner rings and the outer rings of the ball bearing.

Figure 1B:
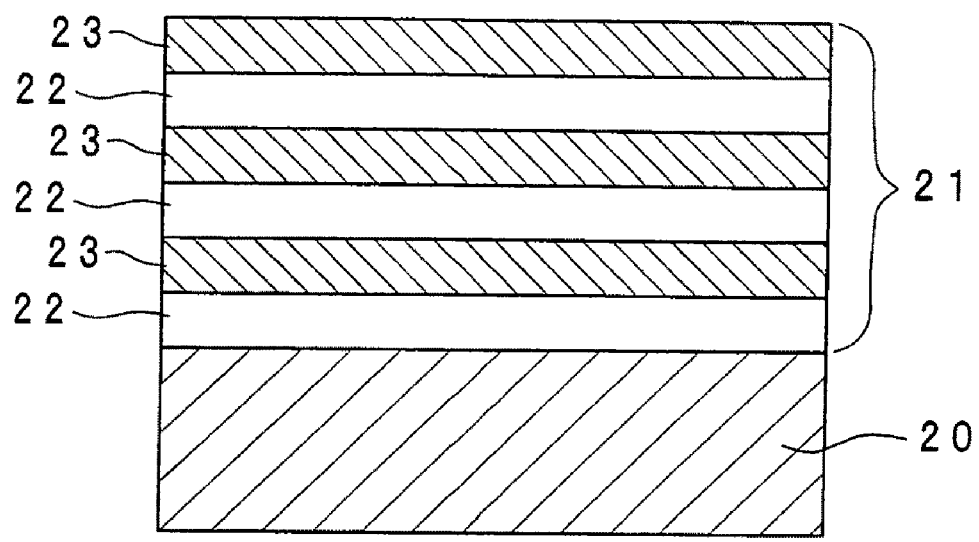
FIG. 1B is a schematic sectional view showing the structure of a surface layer portion of an outer end face in the axial direction of the ball bearing cage shown in FIG. 1A.

FIG. 1B is a schematic sectional view showing the structure of a surface layer portion of the outer end face in the axial direction of the ball bearing cage denoted by the reference numeral 5 in FIG. 1A.

As shown in FIG. 1B, the surface layer portion of the end face 5 is constructed of a main body part 20 and a multilayer film 21 formed on the main body part 20. The main body part 20 is made of an SPCC material. The shape of the main body part 20 is generally configured with the shape of the portion of the cage shown in FIG. 1A excluding the rivets. The multilayer film 21 is constructed of six layers by alternately layering nickel layers 22 and copper layers 23, and the multilayer film 21 has five interfaces between the nickel layers 22 and the copper layers 23. As shown in FIG. 1B, the nickel layer 22 is put in contact with the main body part 20. The layer thickness of each of the nickel layers 22 is set not smaller than 15 nm and not greater than 100 nm, and the layer thickness of each of the copper layers 23 is set not smaller than 3 nm and not greater than 100 nm. Moreover, the film thickness of the multilayer film is set greater than 200 nm and not greater than 8000 nm. The multilayer film 21 is formed on the main body part 20 by an electroplating process. In the multilayer film 21, it can be considered that about one nickel atom per about 38 or 39 nickel atoms geometrically causes a lattice mismatch in the interfaces between the nickel layers 22 and the copper layers 23 when calculated from the lattice constant.

Figure 2A:
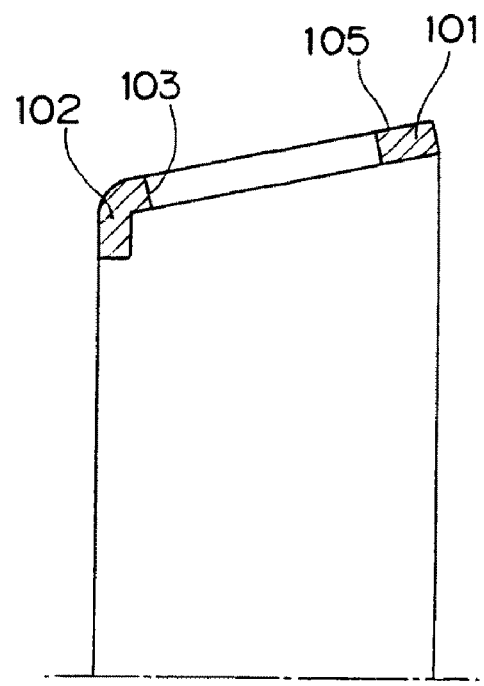
FIG. 2A is a sectional view in the axial direction of a tapered roller bearing cage of a second embodiment of the present invention.

FIG. 2A is a sectional view in the axial direction of a tapered roller bearing cage of a second embodiment of the present invention.

The tapered roller bearing cage is a pressed cage formed by punching a steel plate. The tapered roller bearing cage has an annular shape, a major diameter annular portion 101, a minor diameter annular portion 102, and a plurality of bar portions (not shown) that extend generally in the axial direction for connection between the major diameter annular portion 101 and the minor diameter annular portion 102 and are arranged generally at equal intervals in the circumferential direction. A space surrounded by the major diameter annular portion, the minor diameter annular portion and the bar portions located adjacent in the circumferential direction forms a pocket 103 that accommodates tapered rollers.

Figure 2B:
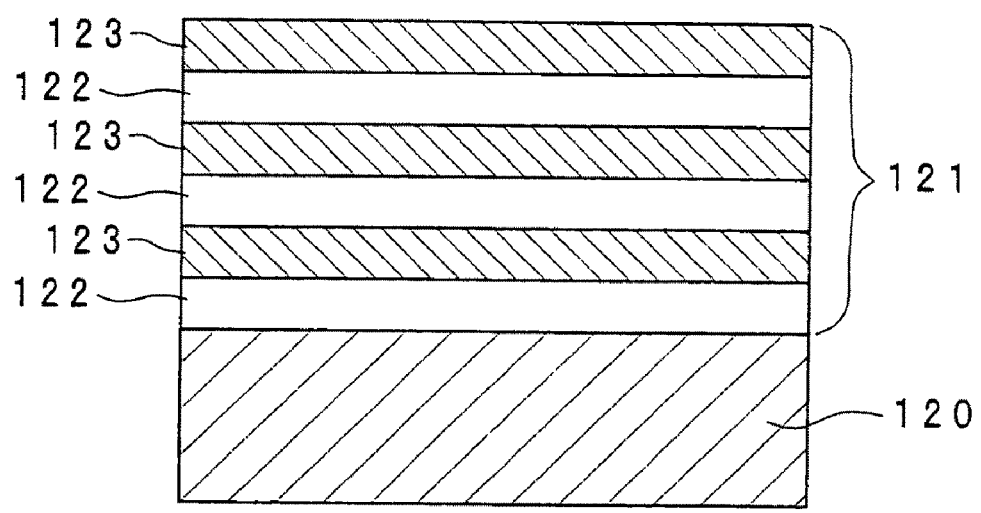
FIG. 2B is a schematic sectional view showing the structure of a surface layer portion of the outer surface in the radial direction of the roller bearing cage shown in FIG. 2A.

FIG. 2B is a schematic sectional view showing the structure of the surface layer portion of the outer surface in the radial direction of the tapered roller bearing cage denoted by the reference numeral 105 in FIG. 2A.

As shown in FIG. 2B, the surface layer portion of the surface 105 is constructed of a main body part 120 and a multilayer film 121 formed on the entire surface of the main body part 120. The main body part 120 is made of an SPCC (cold-rolled steel) material. The multilayer film 121 is constructed of six layers by alternately layering nickel layers 122 and copper layers 123, and the multilayer film 121 has five interfaces between the nickel layers 122 and the copper layers 123. As shown in FIG. 2B, the nickel layer 122 is put in contact with the main body part 120. The layer thickness of each of the nickel layers 122 is set not smaller than 15 nm and not greater than 100 nm, and the layer thickness of each of the copper layers 123 is set not smaller than 3 nm and not greater than 100 nm. Moreover, the film thickness of the multilayer film is set greater than 200 nm and not greater than 8000 nm. The multilayer film 121 is formed on the main body part 120 by an electroplating process. In the multilayer film 121, it can be considered that about one nickel atom per about 38 or 39 nickel atoms geometrically causes a lattice mismatch in the interfaces between the nickel layers 122 and the copper layers 123 when calculated from the lattice constant.

Figure 3:
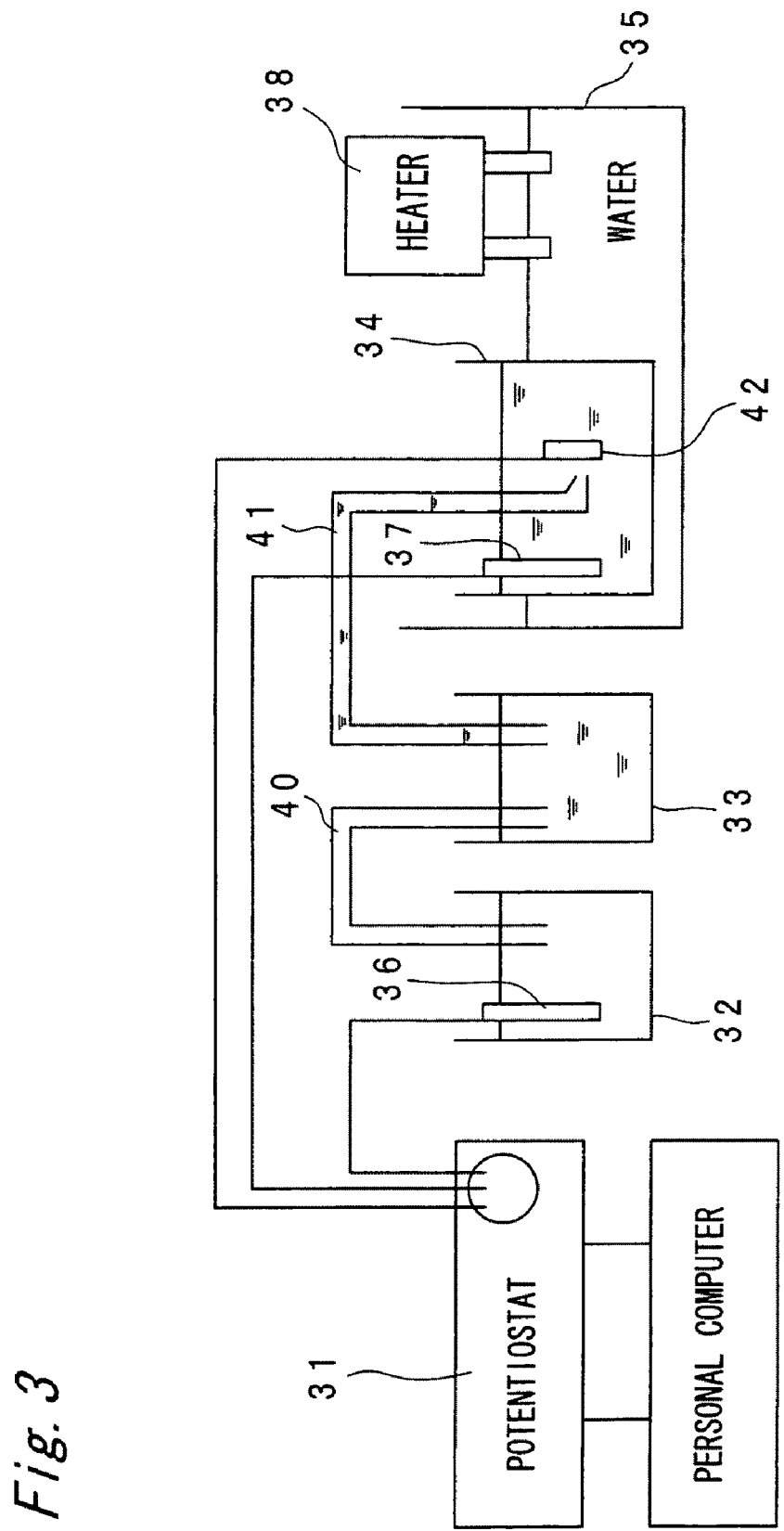
FIG. 3 is a schematic view showing an apparatus for forming a multilayer film on a main body part.

FIG. 3 is a schematic view showing an apparatus for forming a multilayer film on the main body part (the main body part 20 of the first embodiment and the main body part 120 of the second embodiment).

The apparatus has a potentiostat 31, first, second, third and fourth containers 32, 33, 34 and 35, a reference electrode 36, a counter electrode 37, a heater 38, a KCl salt bridge 40 and a Luggin capillary 41.

The first container 32 is filled with a KCl saturated aqueous solution, and the second and third containers 33 and 34 are filled with a plating solution containing nickel ions and copper ions. Moreover, the fourth container 35 is filled with water, and the water is heated to a prescribed temperature by the heater 38. A silver-silver chloride electrode is placed as the reference electrode 36 in contact with the solution in the first container 32, and the counter electrode 37 made of nickel or platinum is placed in contact with the solution in the third container 34. A voltage is applied between the counter electrode 37 and a sample 42. A potential difference between the reference electrode 36 and the sample 42 is measured by the potentiostat 31, and the voltage applied between the counter electrode 37 and the sample 42 is controlled so that the difference comes to have a prescribed value. The third container 34 is placed in the fourth container 35 and adjusted to a prescribed temperature by the water put in the fourth container 35.

The apparatus forms a multilayer film on the main body part as follows. First of all, the main body part 42 constructed of an annular plate member made of SPCC of an alternate succession of semicircular portions and flat portions having through holes is placed in contact with the plating solution in the third container 34. Next, after the temperature of the plating solution is maintained at approximately 40° C. by maintaining the temperature of the water in the fourth container 35 at approximately 40° C. by the heater 38, a voltage is applied between the counter electrode 37 and the main body part 42 so that the potential difference between the reference electrode 36 and the main body part 42 comes to have a value appropriate for depositing each of copper and nickel by the potentiostat 31. In detail, nickel has an ionization tendency greater than copper and tends to remain in the plating solution. For the above reasons, by applying a voltage between the counter electrode 37 and the main body part 42 so that the potential of the main body part 42 with respect to the reference electrode 36 has prescribed two steps, a copper layer is formed by depositing copper when the potential difference is small, and a nickel layer is formed by depositing nickel when the potential difference is large. In this case, there is a problem that the deposition of copper that is nobler than nickel cannot be prevented during the nickel deposition. Therefore, the deposition of copper is suppressed as far as possible during the nickel deposition by setting the copper ion concentration lower than the nickel ion concentration in the plating solution.

Figure 4:
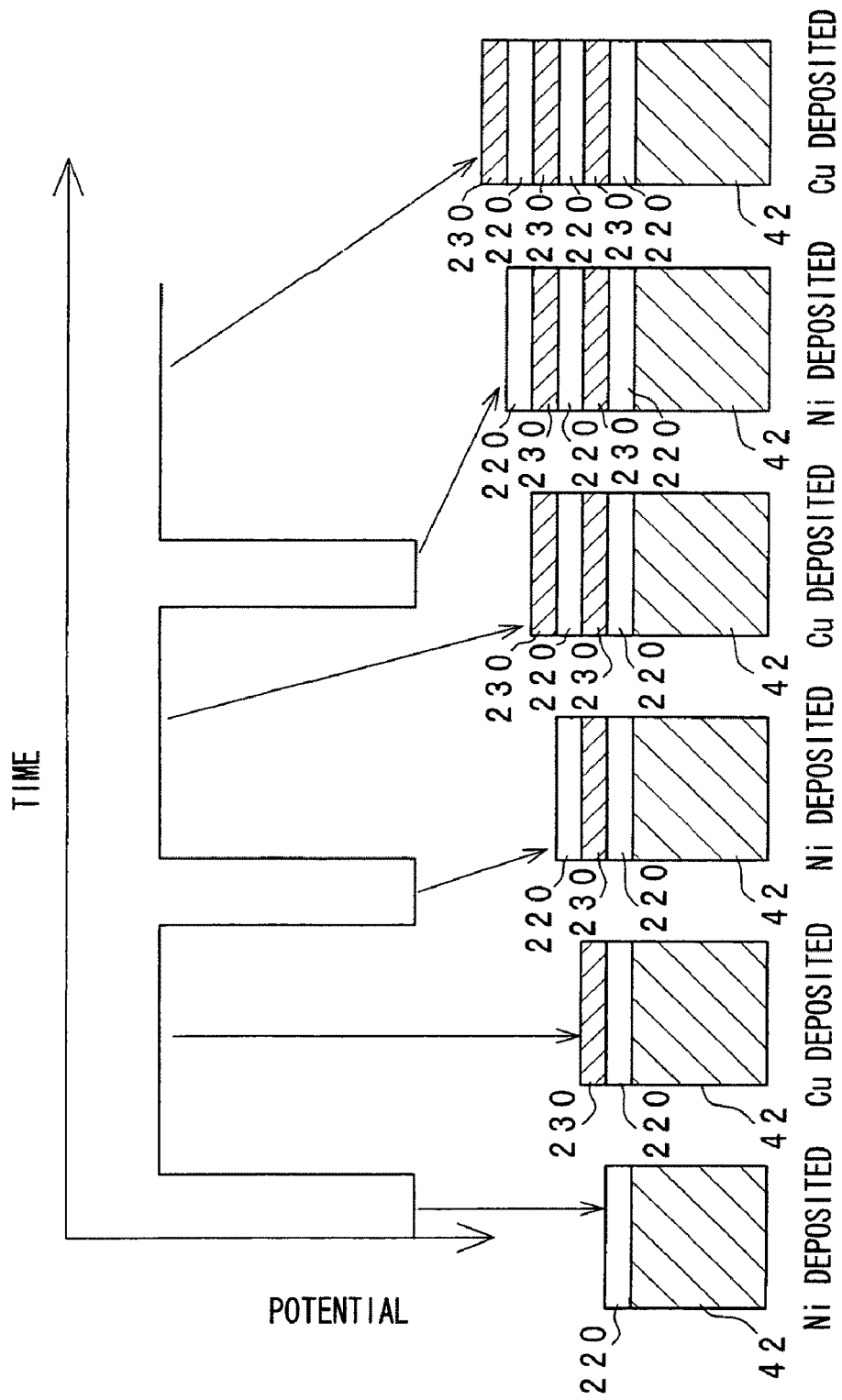
FIG. 4 is a view showing one example of a timewise change of a voltage applied between a reference electrode and the main body part and the formation states of films on the main body part when the voltage is applied.

FIG. 4 is a view showing one example of a timewise change of the potential difference measured between the reference electrode 36 and the main body part 42 and the formation states of films on the main body part 42 in the case. It is noted that the reference numeral 220 denotes a nickel layer, and the reference number 230 denotes a copper layer in FIG. 4.

As shown in FIG. 4, if the deposition potential is appropriately set, nickel and copper can be deposited substantially singly and alternately from one film formation solution due to the difference in the ionization tendency between nickel and copper. In this case, the potential difference when nickel, of which the ionization tendency is greater than that of copper, is deposited is greater than the potential difference when copper is deposited.

Figure 5:
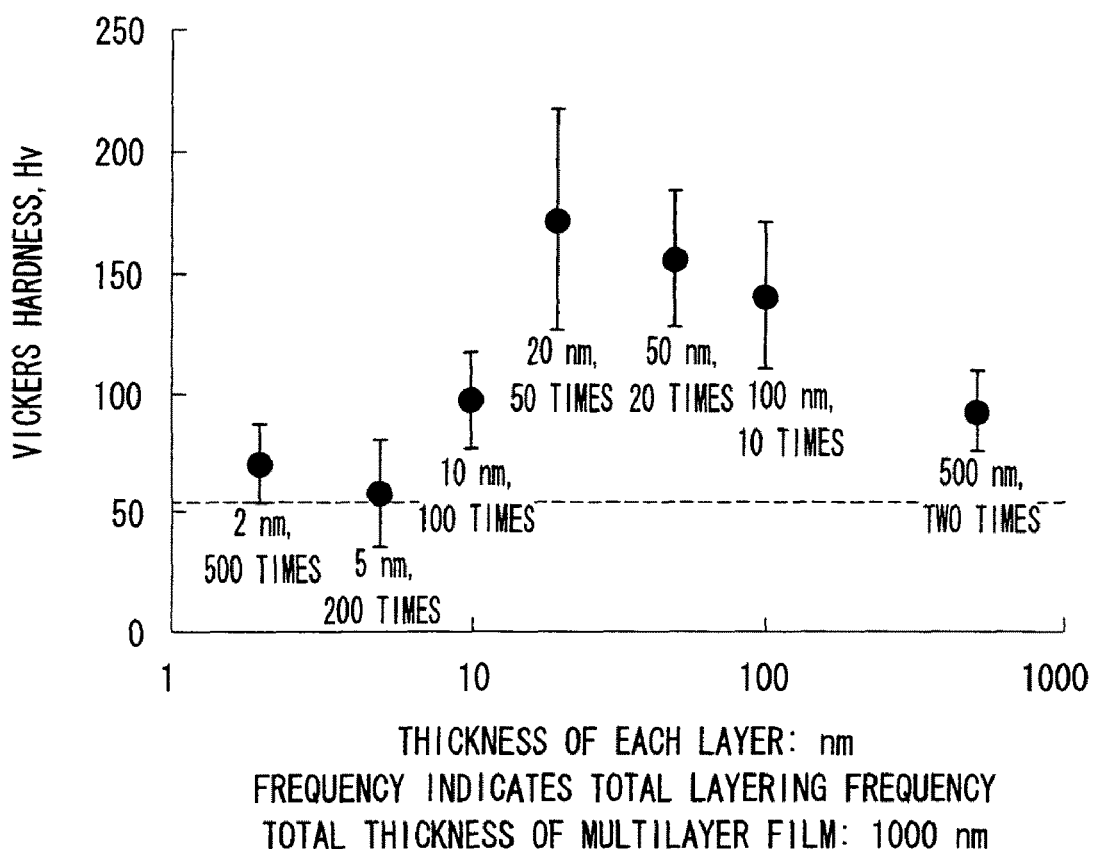
FIG. 5 is a graph showing a relation between the layer thickness of one layer in a multilayer film and the hardness of the multilayer film when the multilayer film is formed by alternately layering nickel layers of a consistently identical layer thickness and copper layers that have a layer thickness identical to that of the nickel layers.

FIG. 5 is a graph showing a relation between the layer thickness of one layer in a multilayer film and the hardness of the multilayer film when the multilayer film of a total film thickness of 1000 nm is formed by alternately layering nickel layers of a consistently identical layer thickness and copper layers that have a layer thickness identical to that of the nickel layers.

As shown in FIG. 5, the Vickers hardness of the multilayer film is maximized when the thickness of one layer is 20 nm.

FIG. 6 is a graph showing a relation between the layer thickness of one copper layer and the Vickers hardness of a multilayer film in the multilayer film, which has a total film thickness of 2000 nm and is formed by alternately layering nickel layers of a consistently identical layer thickness of 20 nm and copper layers of which the layer thickness is consistently identical and the layer thickness is varied. In FIG. 6, points depicted with larger diameter indicate the average of the measured values. As shown in FIG. 6, the Vickers hardness of the multilayer film is maximized when the layer thickness of copper is 5 nm. By further experiments, the characteristics of hardness, abrasion resistance and so on of the cage surface can be made most satisfactory when the layer thickness of the nickel layers in the multilayer film is set to 20 nm±5 nm and the layer thickness of the copper layers in the multilayer film is set to 5 nm±2 nm.

Figure 7A:
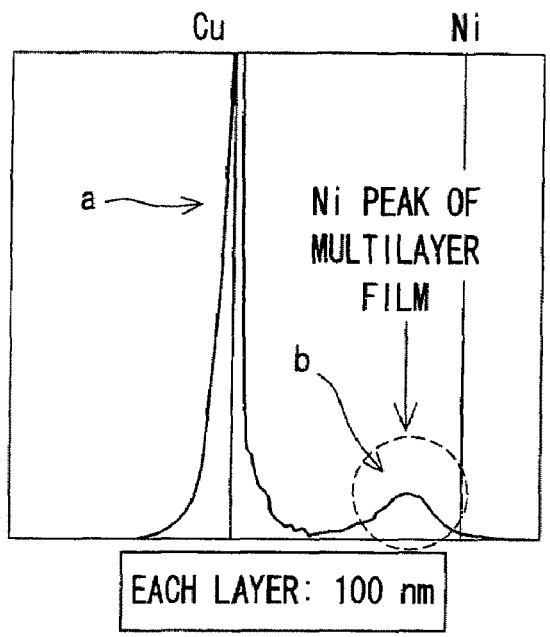
FIG. 7A is a view showing an angular distribution of an X-ray diffraction intensity when X rays are applied to a multilayer film formed by alternately layering a nickel layer that has a layer thickness of 100 nm and a copper layer that has a layer thickness of 100 nm.
Figure 7B:
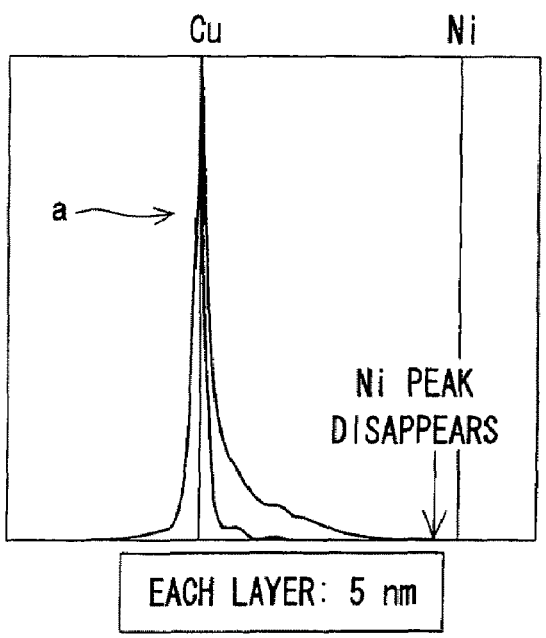
FIG. 7B is a view showing an angular distribution of an X-ray diffraction intensity when X rays are applied to a multilayer film formed by alternately layering a nickel layer that has a layer thickness of 5 nm and a copper layer that has a layer thickness of 5 nm.

FIG. 7A is a view showing an angular distribution of an X-ray diffraction intensity when X rays are applied to a multilayer film formed by alternately layering a nickel layer that has a layer thickness of 100 nm and a copper layer that has a layer thickness of 100 nm. FIG. 7B is a view showing an angular distribution of an X-ray diffraction intensity when X rays are applied to a multilayer film formed by alternately layering a nickel layer that has a layer thickness of 5 nm and a copper layer that has a layer thickness of 5 nm. In FIGS. 7A and 7B, "a" indicates the peak of copper, which almost coincides with the peak that can be theoretically calculated from the lattice constant. Moreover, in FIG. 7A, "b", which is shifted slightly to the lower angle side from the peak that can be theoretically calculated, indicates the peak of nickel of the multilayer film.

As shown in FIGS. 7A and 7B, both the peak of copper and the peak of nickel appear when the layer thickness of each of the layers is 100 nm, while only the peak of copper appears when the layer thickness of each of the layers is 5 nm. This is presumably ascribed to the fact that, in the multilayer film where each of the layers has a thickness of 5 nm, the lattice mismatch (misfit dislocation) described later has disappeared as a result of a change in the lattice constant of nickel so as to follow after that of copper. As described above, it is presumed that the hardness of the multilayer film has rapidly reduced due to the disappearance of the misfit dislocation regarded as an obstruction of the dislocation motion when each of the thickness of layers is excessively reduced.

Figure 8:
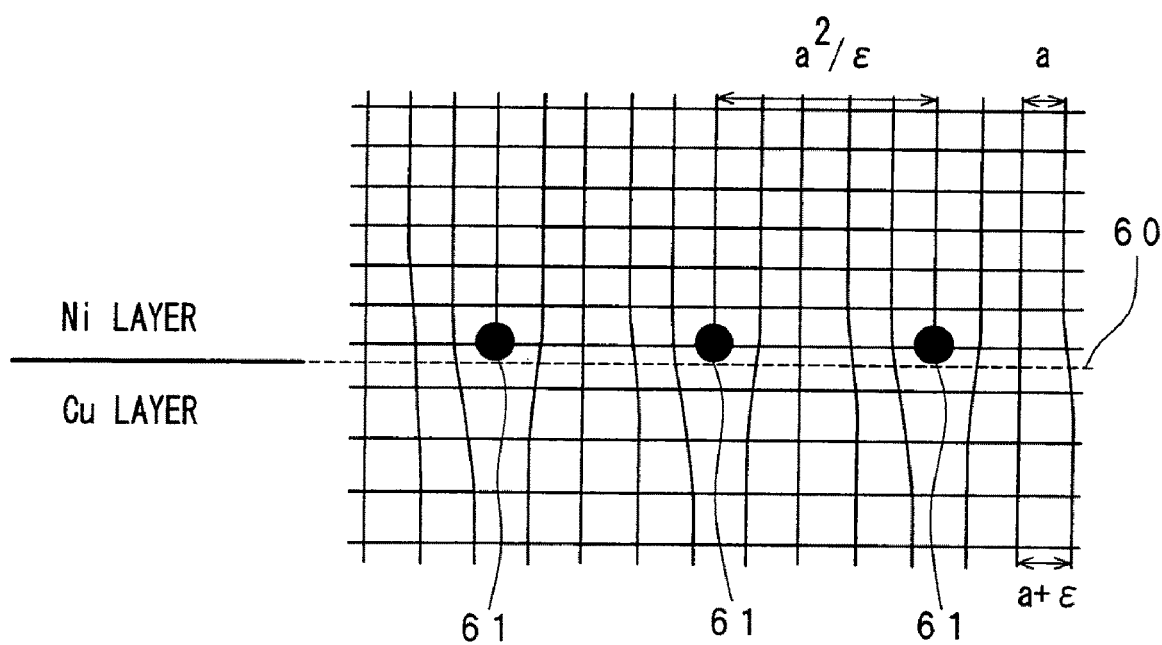
FIG. 8 is a view schematically showing a misfit dislocation in an interface between a nickel layer and a copper layer.

FIG. 8 is a view schematically showing a misfit dislocation in an interface between a nickel layer and a copper layer. In FIG. 8, the dashed line 60 indicates an interface. Since the lattice constant of a nickel atom is smaller than the lattice constant of a copper atom, there is a nickel atom whose corresponding copper atom is not existing, i.e., a nickel atom that is causing a lattice mismatch (misfit), as indicated with the reference numeral 61. The development of excellent mechanical characteristics of the multilayer film is presumably ascribed to the fact that the lattice mismatch becomes an obstruction of the dislocation motion. As shown in FIG. 8, the more nickel atoms that are causing the lattice mismatch exist in the interface, the more occurrence of surface cracks can be suppressed and the more development of the cracks from the main body part can be suppressed. Thus, the fatigue strength can be improved, the tensile strength is increased, the hardness is increased, and the abrasion resistance is improved.

FIG. 9 is a graph showing the results of measuring the hardness of specimens obtained by layering nickel layers of a consistently identical layer thickness of 75 nm and copper layers of a layer thickness equal to that of the nickel layers 20 times, 40 times and 60 times. It can be understood that there is no large difference in hardness between the cases where the layering is 40 times and 60 times although the average hardness is increased as the layering is increased. According to further experiments, the same tendency was observed when the layer thickness of the nickel layer was 15 nm and the layer thickness of the copper layer was 5 nm. That is, a more satisfactory effect can be obtained when the total thickness of the multilayer film of the present invention exceeds 200 nm and the layering frequency exceeds 20 times.

Figure 10A:
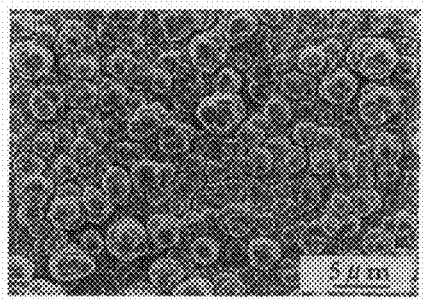
FIG. 10A is a view showing a scanning electron microscope photograph of the surface of a multilayer film formed by alternately layering nickel layers of a consistently identical layer thickness of 50 nm and copper layers of layer thickness equal to that of the nickel layers so that the total film thickness becomes 10 μm.

FIG. 10A is a view showing a scanning electron microscope photograph of the surface of a multilayer film formed by alternately layering nickel layers of a consistently identical layer thickness of 50 nm and copper layers of a layer thickness equal to that of the nickel layers so that the total film thickness becomes 10 μm.

As shown in FIG. 10A, the surface is not smooth but grown granularly. When the surface presents severe irregularities as described above it is known that not only the frictional characteristic is degraded but also the irregularities become crack nuclei to degrade also the fatigue characteristic.

Figure 10B:
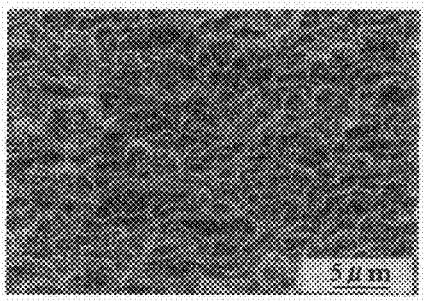
FIG. 10B is a view showing a scanning electron microscope photograph of the surface of a multilayer film formed by alternately layering nickel layers of a consistently identical layer thickness of 50 nm and copper layers of a layer thickness equal to that of the nickel layers so that the total film thickness becomes 8 μm.
Figure 10C:
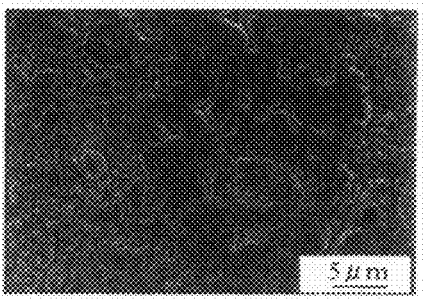
FIG. 10C is a view showing a scanning electron microscope photograph of the surface of a multilayer film formed by alternately layering nickel layers of a consistently identical layer thickness of 50 nm and copper layers of a layer thickness equal to that of the nickel layers so that the total film thickness becomes 6 μm.
Figure 10D:
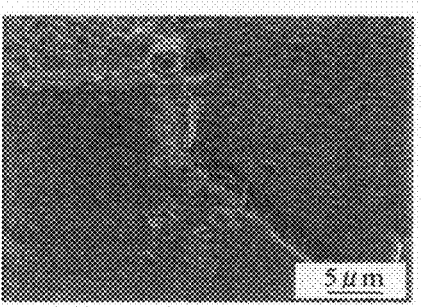
FIG. 10D is a view showing a scanning electron microscope photograph of the surface of a multilayer film formed by alternately layering nickel layers of a consistently identical layer thickness of 50 nm and copper layers of a layer thickness equal to that of the nickel layers so that the total film thickness becomes 4 μm.

FIG. 10B is a view showing a scanning electron microscope photograph of the surface of a multilayer film formed by alternately layering nickel layers of a consistently identical layer thickness of 50 nm and copper layers of a layer thickness equal to that of the nickel layers so that the total film thickness becomes 8 µm and FIG. 10C is a view showing a scanning electron microscope photograph of the surface of a multilayer film formed by alternately layering nickel layers of a consistently identical layer thickness of 50 nm and copper layers of a layer thickness equal to that of the nickel layers so that the total film thickness becomes 6 µm. FIG. 10D is a view showing a scanning electron microscope photograph of the surface of a multilayer film formed by alternately layering nickel layers of a consistently identical layer thickness of 50 nm and copper layers of a layer thickness equal to that of the nickel layers so that the total film thickness becomes 4 µm.

According to further experiments, it was revealed that the surface configuration of severe irregularities described above resulted when the total film thickness exceeded about 8 µm within the range of the thickness of each of the layers. Therefore, the effect of the present invention is produced when the total thickness of the multilayer film of the present invention is not greater than 8000 nm. The total thickness of the multilayer film should preferably be not greater than 6000 nm, and the total thickness of the multilayer film should more preferably be made not greater than 4000 nm.

Figure 11:
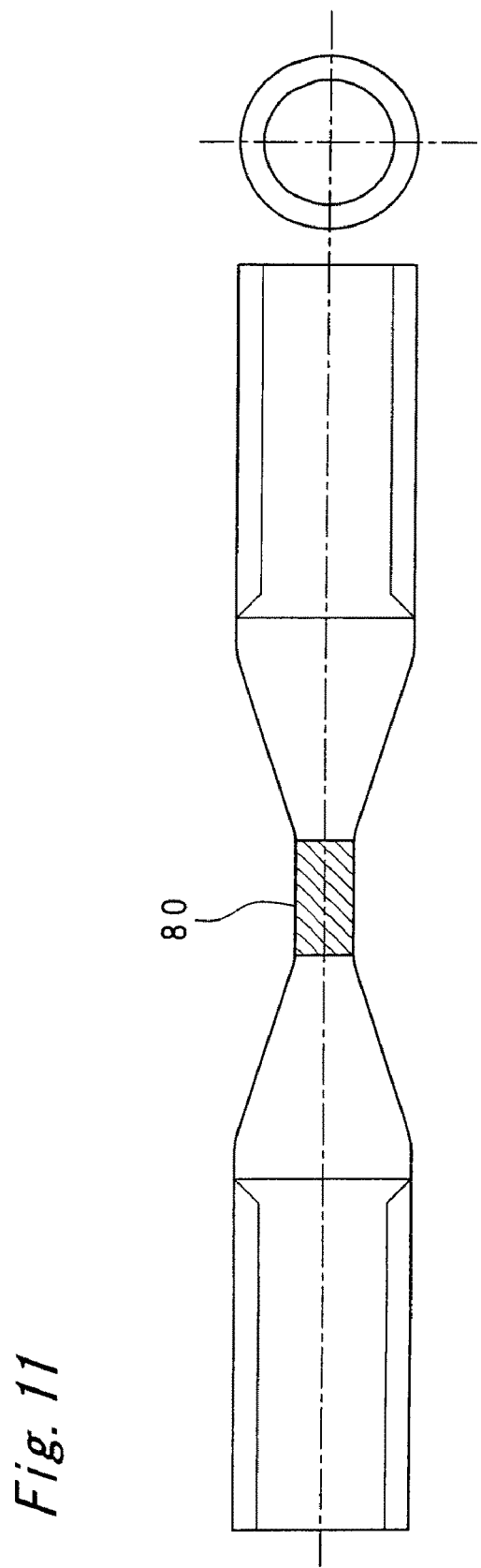
FIG. 11 is a view showing a specimen for a fatigue test, in which a multilayer film having a total film thickness of 5 μm is formed in the position indicated by hatched lines by alternately layering nickel layers of a consistently identical layer thickness and copper layers that have a layer thickness equal to that of the nickel layers.
Figure 12:
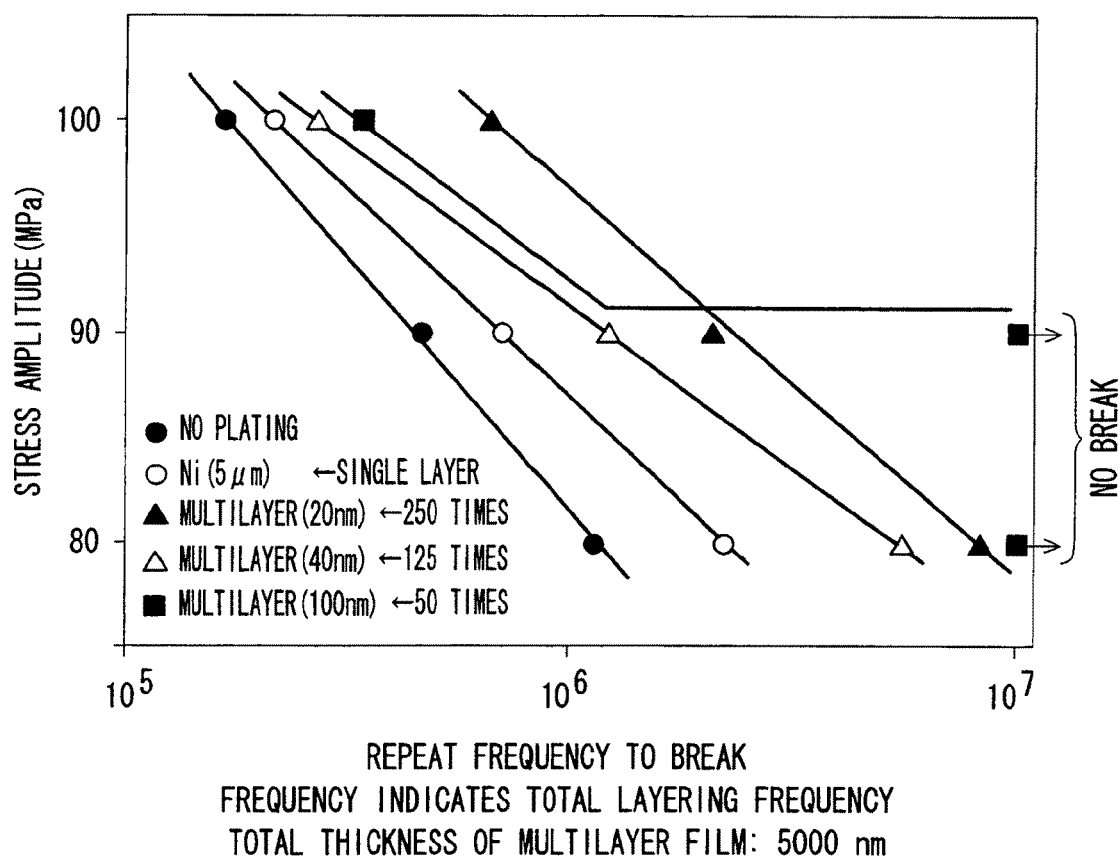
FIG. 12 is a graph showing the results of carrying out repetitive compression-tension fatigue tests of the specimen of FIG. 11.

FIG. 11 is a view showing a specimen of a multilayer film, which has a total film thickness of 5 µm and is formed by alternately layering nickel layers of a consistently identical layer thickness and copper layers that have a layer thickness identical to that of the nickel layers in the position denoted by the reference numeral 80 (in the position indicated by the hatched lines). For comparison, a specimen that has a Ni single layer plating of a film thickness of 5 µm and a specimen that has no coating were prepared in place of the multilayer film. FIG. 12 shows the results of carrying out repetitive compression-tension fatigue tests of the specimens.

As shown in FIG. 12, it can be understood that the specimen on which the multilayer film is formed has a longer fatigue life than that of the single Ni single layer plating regardless of layer thickness. Moreover, it can be understood that a great effect is produced for improving the fatigue strength even when the layer thickness is 100 nm, differently from the results of FIGS. 7 and 8.

This fact reveals that a sufficient number of interfaces that become obstructions of dislocation motions can exist when the layer thickness of the nickel layers is not smaller than 15 nm and not greater than 100 nm, the layer thickness of the copper layers is not smaller than 3 nm and not greater than 100 nm and the layering frequency is a number exceeding 20 times, and the mechanical characteristics of the cage can be remarkably improved in the ball bearing cage of the present invention. Moreover, since the total thickness of the multilayer film is 8000 nm (8 µm) at maximum, the material cost and the manufacturing cost of the multilayer film can be reduced.

According to the ball bearing cage of the first embodiment, the strength of the cage is increased by the multilayer film 21 formed on the end face of the main body part 20, and therefore, the cage can be reduced in thickness. That is, since the cage is allowed to have a thickness that can easily be made highly accurate by press forming, the accuracy of the ball guiding surface of the cage, which has been heavily inferior to the sphericity of the ball, can be remarkably improved, and the rotary torque and vibrations can be remarkably reduced.

Moreover, according to the ball bearing cage of the first embodiment, the mechanical strength is increased by the multilayer film 21 formed on the end face of the main body part 20, and therefore, the thickness in the axial direction of the main body part 20 can be reduced. Therefore, the cage can be compacted and reduced in weight.

Moreover, according to the ball bearing cage of the first embodiment, the multilayer film 21 is formed by the electroplating process, and therefore, the multilayer film 21 can be formed at lower cost than when the multilayer film is formed by the vacuum deposition process. Moreover, the multilayer film 21 in which the layer thickness of each of the layers is generally uniform can be formed on the entire outer surface of the cage.

Although the multilayer film 21 is formed on the entire outer surface of the main body part 20 in the ball bearing cage of the first embodiment, effects and function similar to those of the first embodiment can be obtained if the multilayer film is formed at least on the outer surface in the axial direction of the main body part.

If the ball bearing cage of the first embodiment of the present invention is adopted as the cage of a ball bearing, the reliability of the ball bearing can be improved because the strength of the cage is great.

Figure 13:
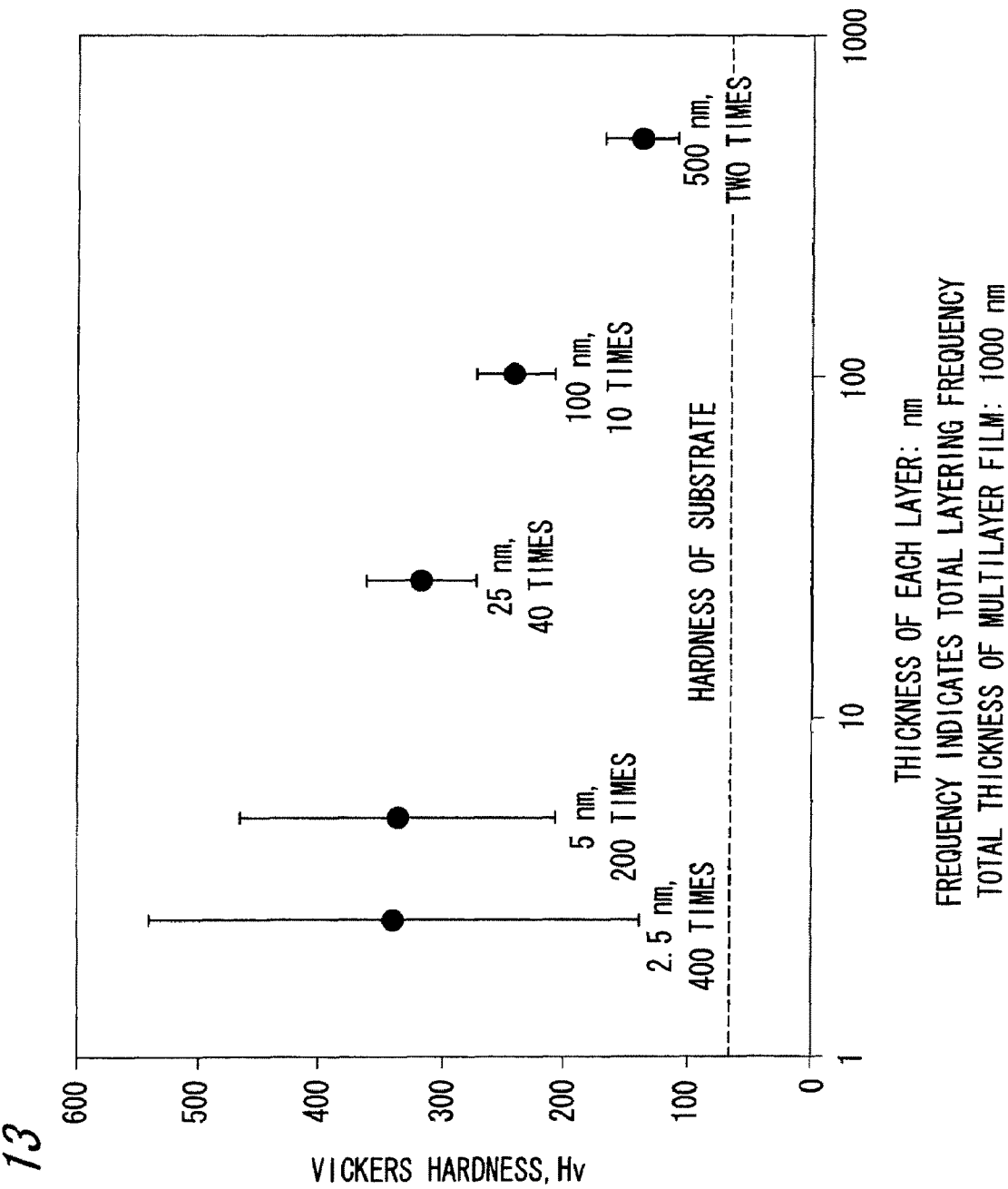
FIG. 13 is a graph showing a relation between the layer thickness of one layer in a multilayer film and the hardness of the multilayer film when the multilayer film is formed by alternately layering cobalt layers of a consistently identical layer thickness and copper layers that have a layer thickness identical to that of the cobalt layers.

Moreover, it is a matter of course that the combination of the mutually different metals or alloys of the adjoining layers that form the multilayer film is not limited to the combination of the nickel layers and the copper layers in the ball bearing cage of the present invention. For example, as shown in FIG. 13, an interface that becomes an obstruction of a dislocation motion is formed by the combination of cobalt layers and copper layers, and the hardness is increased, allowing the strength of the cage to be improved.

Otherwise, in the ball bearing cage of the present invention, the metals and alloys that form the multilayer film can arbitrarily be selected according to the demanded performance as a combination of nickel-cobalt alloy layers and copper layers, a combination of nickel layers and silver layers or the like.

Furthermore, in the ball bearing cage of the present invention, the combination of the mutually different metals or alloys of the adjoining layers that form the multilayer film may be provided by a combination of three or more kinds of metals or alloys.

Moreover, in the ball bearing cage of the present invention, a film that becomes an interlayer between the cage and the multilayer film may be provided depending on the combination of the composition of the multilayer film to be formed and the material of the cage so that the multilayer film can easily be formed on the cage and adhesion between the cage and the multilayer film can be improved.

Furthermore, in the roller bearing cage of the present invention as described above, a sufficient number of interfaces that become obstructions of dislocation motions can exist when the layer thickness of the nickel layers is not smaller than 15 nm and not greater than 100 nm, the layer thickness of the copper layers is not smaller than 3 nm and not greater than 100 nm and the layering frequency is a number exceeding 20 times, and the mechanical characteristics of the cage can be remarkably improved. Moreover, since the total thickness of the multilayer film is 8000 nm (8 µm) at maximum, the material cost and the manufacturing cost of the multilayer film can be reduced.

That is, in the roller bearing cage of the present invention, a sufficient number of interfaces that become obstructions of dislocation motions can exist when the layer thickness of the nickel layers is not smaller than 15 nm and not greater than 100 nm, the layer thickness of the copper layers is not smaller than 3 nm and not greater than 100 nm and the layering frequency is a number exceeding 20 times, and the mechanical characteristics of the cage and the strength, hardness, and abrasion resistance of the cage can be remarkably improved. Moreover, since the total thickness of the multilayer film is 8000 nm (8 μm) at maximum, the material cost and the manufacturing cost of the multilayer film can be reduced. Moreover, since the strength of the cage is increased, the cage can be reduced in thickness. When the cage is manufactured by press forming, the accuracy of the inner circumferential surfaces of the pockets of the cage can be remarkably improved since the cage is allowed to have a thickness that can easily be made highly accurate by press forming.

This allows the roller behaviors to be stabilized by reducing skew of the rollers and so on in the roller bearing cage of the present invention, allows the rotary torque and vibrations of the bearing to be remarkably reduced and allows lifetime of the roller bearing to be prolonged.

According to the roller bearing cage of the second embodiment, the mechanical strength is increased by the multilayer film 21 formed on the surface of the main body part 20, and therefore, the main body part 20 can be reduced in thickness. Therefore, the cage can be compacted and reduced in weight.

Moreover, according to the roller bearing cage of the second embodiment, the multilayer film 21 is formed by the electroplating process, and therefore, the multilayer film 21 can be formed regardless of the dimensions of the main body part 20 in comparison with the case where the multilayer film is formed by the vacuum deposition process and formed at remarkably low cost. Moreover, the multilayer film 21 in which the layer thickness of each of the layers is generally uniform can be formed on the entire surface of the cage.

Although the material of the main body part is SPCC in the roller bearing cage of the second embodiment, the material of the main body part of the cage may be made of a metal material other than SPCC in the present invention.

Moreover, it is a matter of course that the combination of the mutually different metals or alloys of the adjoining layers that form the multilayer film is not limited to the combination of the nickel layers and the copper layers in the roller bearing cage of the present invention. For example, as shown in FIG. 13, an interface that becomes an obstruction of a dislocation motion is formed by the combination of cobalt layers and copper layers, and the hardness is increased, allowing the strength of the cage to be improved.

Otherwise, in the roller bearing cage of the present invention, the metals and alloys that form the multilayer film can arbitrarily be selected according to the demanded performance as a combination of nickel-cobalt alloy layers and copper layers, a combination of nickel layers and silver layers or the like.

Furthermore, in the roller bearing cage of the present invention, the combination of the mutually different metals or alloys of the adjoining layers that form the multilayer film may be provided by a combination of three or more kinds of metals or alloys.

Moreover, in the roller bearing cage of the present invention, a film that becomes an interlayer between the cage and the multilayer film may be provided depending on the combination of the composition of the multilayer film to be formed and the material of the cage so that the multilayer film can easily be formed on the cage and adhesion between the cage and the multilayer film can be improved.

Moreover, although the roller bearing cage of the second embodiment is the tapered roller bearing cage, the roller bearing cage of the present invention may be a cylindrical roller bearing.

If the roller bearing cage of the second embodiment of the present invention is adopted as the cage of a roller bearing, the reliability of the roller bearing can be improved since the strength of the cage is great. Moreover, since the thickness of the cage is thin and the weight of the cage is light, the roller bearing can be reduced in weight.

The invention claimed is:

1. A rolling bearing cage comprising:
   an annular main body part;
   and a multilayer film which is formed layered on a surface of the main body part by an electroplating process and in which adjoining layers are comprised of mutually different metals or alloys, wherein
   the multilayer film is a multilayer film in which nickel layers and copper layers are alternately layered.

2. The rolling bearing cage as claimed in claim 1, wherein the main body part comprises a pocket which accommodates a ball by holding the ball from both sides in an axial direction of the main body part.

3. The rolling bearing cage as claimed in claim 2, wherein the multilayer film is formed on an outer surface in the axial direction of the main body part.

4. The rolling bearing cage as claimed in claim 2, wherein the rolling bearing cage is formed by connecting two wave-shaped annular plate members of an alternate succession of semicircular portions and flat portions, and the multilayer film is formed so as to include boundaries between the semicircular portions and the flat portions.

5. The rolling bearing cage as claimed in claim 2, wherein the rolling bearing cage is formed by connecting a plurality of members, and the multilayer film is formed so as to include connecting portions of said plurality of members.

6. A ball bearing comprising the rolling bearing cage claimed in claim 2.

7. The rolling bearing cage as claimed in claim 1, wherein each of the nickel layers in the multilayer film has a layer thickness of not smaller than 15 nm and not greater than 100 nm, each of the copper layers in the multilayer film has a layer thickness of not smaller than 3 nm and not greater than 100 nm, and the multilayer film has a film thickness of exceeding 200 nm and not greater than 8000 nm.

8. The rolling bearing cage as claimed in claim 1, wherein the multilayer film is formed by layering the nickel layers and the copper layers in excess of 20 times.

9. The rolling bearing cage as claimed in claim 1, wherein the main body part is formed by connecting between two annular portions with a plurality of bar portions and has a pocket to accommodate a roller.

10. The rolling bearing cage as claimed in claim 9, wherein the multilayer film is formed on an outer surface in a radial direction of the main body part.

11. The rolling bearing cage as claimed in claim 9, wherein the multilayer film is formed on an inner surface in a radial direction of the main body part.

12. A roller bearing comprising the rolling bearing cage claimed in claim 9.

13. A roller bearing cage comprising:
    an annular main body part; and
    a multilayer film which is formed layered on a surface of the main body part by an electroplating process and in which adjoining layers are comprised of mutually different metals or alloys, wherein the multilayer film is a multilayer film in which cobalt layers and copper layers, nickel-cobalt alloy layers and copper layers, or nickel layers and silver layers are alternately layered.

14. The rolling bearing cage as claimed in claim 13, wherein the main body part comprises a pocket which accommodates a ball by holding the ball from both sides in an axial direction of the main body part.

15. A ball bearing comprising a ball bearing cage claimed in claim 14.

16. The rolling bearing cage as claimed in claim 13, wherein

The main body part is formed by connecting between two annular portions with a plurality of bar portions and has a pocket to accommodate a roller.

17. A roller bearing comprising the roller bearing cage claimed in claim 16.

* * * * *